United States Patent Office 2,922,763
Patented Jan. 26, 1960

2,922,763

HIGH TEMPERATURE LUBRICANT COMPOSITION

Raymond B. Tierney, Wappingers Falls, N.Y., assignor to Texaco Inc., a corporation of Delaware No Drawing. Application September 28, 1956
Serial No. 612,582

7 Claims. (Cl. 252—47.5)

This invention relates to improved high temperature lubricant compositions. More particularly, this invention relates to hydraulic fluid compositions having excellent thermal stability and viscosity-temperature characteristics.

Fluid compositions used in modern hydraulic systems, particularly in aircraft, must withstand exceedingly high temperatures. These fluids must also be suitable to enable operation of hydraulic systems at comparatively low temperatures such as are encountered during cold seasonal and climatic conditions. Ordinarily, a composition which will be satisfactory at high temperatures will be unsatisfactory at the lower temperatures encountered during cold weather conditions and it is necessary to incorporate so-called viscosity index-improvers in the composition to maintain the proper viscosity of the fluid at any given temperature.

Many mineral oil and synthetic lubricants are unsatisfactory at the high temperatures developed during the operation of modern hydraulic systems. Compounds which cannot withstand these high temperatures show the effects of being subjected to this heat by darkening, charring, increasing acidity, and viscosity changes. The base material for high temperature hydraulic fluids must not develop any of these traits to be considered acceptable.

Methacrylate polymers are well known and extensively used V.I. improvers because of their excellent performance in this respect. Unfortunately, methacrylate polymers at relatively high temperatures are not heat stable and tend to decompose or depolymerize. When this depolymerization occurs, the polymers rapidly decrease in viscosity which in turn adversely affects the viscosity of the entire composition.

Accordingly, this invention concerns a high temperature hydraulic fluid composition comprising an ester-type base fluid stable at temperatures up to 550° F., a V.I. improving minor amount of a methacrylate polymer and a viscosity compensating minor amount of a fatty material consisting essentially of an ester of the dimer of an ethylenic fatty acid, said fatty acid having from 14 to 22 carbon atoms and said ester formed with an aliphatic alcohol having from 1 to 10 carbon atoms.

The ester-type base fluids stable at temperatures up to 550° F. include the diesters of primary alcohols and aliphatic dicarboxylic acids. The dicarboxylic acid component usually contains from 6 to 12 carbon atoms, but glutaric and succinic acids are also included. From the standpoint of cost and availability, the preferred acids are adipic, sebacic, and azelaic. The primary aliphatic alcohol used to form the diester base fluid usually contains at least 4 carbon atoms and may contain 30 or more carbon atoms. $C_6$ to $C_{18}$ alcohols are most commonly used. Specific examples of the dialkyl esters of aliphatic dicarboxylic acids which are the preferred base fluid bases for use in the lubricant composition of the invention are as follows: dibutyl azelate, di-2-ethylhexyl azelate, dilauryl azelate, di-tridecyl azelate, di-hexyl sebacate, di-2-ethylhexyl sebacate, dihexadecyl sebacate, di-2-ethylhexyl adipate, and diisooctyl adipate.

The above described esters meet the rigid thermal stability requirements of high temperature hydraulic fluids. This is demonstrated by the results of an opened vessel test. For this test, 125 ml. of a sample were heated by a heating mantle for 6 hours at 550° F. in an open flask without agitation. All of the materials tested were inhibited with 0.5 wt. percent of phenothiazine. The results of this test are as follows:

Table I

| 125 ml. of sample | Percent viscosity change at 210° F. |
|---|---|
| di-2-ethylhexyl sebacate | +1.4 |
| di-isooctyl adipate | +1.7 |
| di-2-ethylhexyl azelate | +1.7 |
| di-tridecyl azelate | −2.2 |

As shown in the above table these compounds representing the diesters of primary alcohols and aliphatic dicarboxylic acids show little viscosity change after being subjected to these severe conditions. These samples did not show any darkening, charring, deposit formation, or separation. Such a test subjected the samples to severe heat for a greater length of time than was likely to be encountered in a hydraulic system. Compared to the excellent showing of the base fluid esters of the invention the following group of related compounds showed extremely poor thermal stability: di-sec-amyl sebacate, dipropylene glycol diester of sebacic acid, di(2-ethylhexyl triocarbityl)ether, tri-2-ethylhexyl phosphate, and diisooctylphenyl phosphonate. These related compounds decomposed very badly showing darkening, charring, and deposit formation.

The methacrylate polymers which are used in accordance with this invention usually constitute from 1 to 20 weight percent of the composition but preferably from about 5 to 15 percent. They can be either polymers of the same or copolymers of two or more different esters of methacrylic acid and usually have a molecular weight between 5,000 and 20,000. The methacrylate polymers have the following general formula:

wherein R is an aliphatic radical ranging from butyl to stearyl and $n$ is an integer of more than 1. Especially useful methacrylate polymers are those with aliphatic radicals having from 4 to 18 carbon atoms, for example, poly butylmethacrylate, poly octylmethacrylate, poly stearylmethacrylate, and poly laurylmethacrylate. Methacrylate polymers which are also satisfactory for use as V.I. improvers and pour point depressors are the following: a copolymer wherein R in the above formula comprises 20 percent lauryl, 40 percent octyl, and 40 percent cetyl; a copolymer wherein R in the above formula comprises 50 percent stearyl and 50 percent lauryl; a copolymer wherein R in the above formula comprises 50 percent lauryl and 50 percent octyl. The methacrylate polymers are usually sold in the form of a concentrate comprised of approximately 30 to 60 percent polymer in a carrier oil which may be either a synthetic ester type or a mineral type carrier. However, synthetic ester type carrier oils comprising diesters of $C_4$ to $C_{30}$ primary alcohols and $C_4$ to $C_{12}$ aliphatic dicarboxylic acids are preferred owing to their superior blending quality and heat stability.

The dimer acid esters of this invention are included in the composition or blend of the invention in amounts ranging from 1 to 40 percent, but preferably from about 10 to 30 percent, by weight. The dimer acid portion of the esters of the invention are usually formed from polyethylenic monocarboxylic acids having from 12 to 22 carbon atoms. Dimer acids may also be formed by the reaction of a monoethylenic acid with a polyethylenic acid such as the dimer formed by the reaction of a molecule of oleic acid with a molecule of linoleic acid. However, it is necessary to have at least one polyethylenic compound present to form the dimer. Some examples of acids which are useful in forming the dimers are as follows: 4-dodecenoic, 5,9-dimethyl-2,8-decadienoic, myristoleic, palmitoleic, oleic, linoleic (9,11-octadecadienoic, 10,12-octadecadienoic, and 11,13-octadecadienoic), linolenic, erucic, and 13,15-docosadienoic. The preferred acid is linoleic acid. A good source material from which fatty acids can be obtained by hydrolysis are vegetable oils such as soy bean oil, linseed oil, cotton seed oil, corn oil, castor oil, mustard seed oil, and peanut oil.

The aliphatic alcohol portion of the dimer esters contain from 1 to 10 carbon atoms. The dimer esters are usually prepared from $C_1$ to $C_6$ primary aliphatic alcohols with methyl, ethyl, propyl, and butyl alcohols being particularly preferred. Examples of some of the dimer esters useful in accordance with this invention are as follows: dimethyl dilinoleate, diethyl dilinoleate, dibutyl dilinoleate, di-2-ethylhexyl dilinoleate, the dipropyl ester of the dimer of 5,9-dimethyl-2,8-decadienoic acid, the dihexyl ester of the dimer of 13,15-docosadienoic acid, the dibutyl ester of the dimer of linolenic acid, and the dimethyl ester of the dimer of myristoleic and linolenic acids. On the basis of availability and performance, dibutyl dilinoleate is the preferred dimer ester of the invention.

These dimer esters are well known commercially available products prepared by known methods, for example, one method broadly comprises esterifying the prescribed type of olefinic fatty acids with an alcohol in the presence of an alkali metal alcoholate at mild reaction temperatures for a period of several hours. The esters, if formed from mixtures of fatty acids, such as hydrolyzed vegetable oils, are distilled and the esters are polymerized by heating to about 300° C. in the presence of a polymerizing catalyst, such as anthraquinone, benzyl peroxide, borontrifluoride, etc., for about 8 to 30 hours. This treatment results in a polymerized fatty acid ester consisting essentially of the dimer along with small portions of monomer, trimer, and higher polymerized esters. Glycerides have also been heat polymerized to form products containing dimer esters although the yield is comparatively small.

Another method of preparing the dimer acid ester of the invention is to first obtain the dimer acids and thereafter esterifying them with the desired alcohol. Briefly, the method entails steam heating unsaturated fatty acids in a pressure vessel at temperatures from 260 to 360° C. for about 3 to 10 hours to produce a polymerized product mainly consisting of a dimer acid. The dimer acid is separated by distillation means from the product and is then esterified by direct reaction with the desired alcohol.

Additives which are useful and can be included in the composition of the present invention are anti-oxidants and metal deactivators. Phenothiazine, which has the formula:

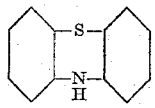

is a particularly effective anti-oxidant and anti-corrosive agent. It inhibits corrosiveness by preventing oxidation of the components to acidic bodies which are inherently corrosive in nature. Phenothiazine is usually present in a concentration of 0.1 to 1.5 wt. percent of the lubricant composition.

As a metal deactivator, a Schiff's base reaction product of 1 mol of an aliphatic polyamine having two primary amino groups with 2 mols of an aromatic aldehyde are also sometimes incorporated in the finished lubricant in an amount ranging from 0.05 to 1 wt. percent. A preferred compound of this class is the commercially available disalicylal propylene diamine also known as disalicylidene-1,2-diaminopropane.

Other additives which are at times incorporated in the lubricant include extreme pressure and anti-wear agents, other anti-oxidants, anti-corrosive agents and foam inhibitors.

The following table is incorporated to demonstrate the thermal instability of the methacrylate polymer V.I. improvers which lose viscosity upon heating.

Table II

| Material | Kin. Viscosity (cs.) at— | | |
|---|---|---|---|
|  | 210° F. | 100° F. | −40° F. |
| (1) Blend A (40% polybutylmethacrylate+60% di-2-ethylhexyl sebacate) before heating | 469.4 | 4,742 | solid |
| (2) Blend A after heating for 6 hours at 550° F | 54.6 | 395.4 | solid |
| (3) Blend B (30% Blend A after heating as in (2)+70% di-2-ethylhexyl azelate) | 7.91 | 32.9 | 4,470 |
| (4) Blend B after heating for 6 hours at 450° F | 7.38 | 32.8 | 4,503 |
| (5) Blend B after heating for 6 hours at 550° F | 5.84 | 25.0 | 3,834 |

It appears from examination of Table II that the methacrylate polymer containing composition continues to lose viscosity as the composition is heated.

The following table is included to demonstrate the thermal properties of a diester base material containing a dimer acid ester.

Table III

| Material | Kin. Viscosity (cs.) at— | | |
|---|---|---|---|
|  | 210° F. | 100° F. | −40° F. |
| (1) Dibutyl dilinoleate before heating | 11.05 | 77.6 | 15,000+ |
| (2) Dibutyl dilinoleate after heating for 6 hours at 550° F | 26.1 | 130.0 | 15,000+ |
| (3) Blend C (30% dibutyldilinoleate after heating as in (2)+70% di-2-ethylhexyl azelate) | 4.46 | 19.85 | 3,455 |
| (4) Blend C after heating for 6 hours at 450° F | 4.96 | 23.2 | 4,531 |
| (5) Blend C after heating for 6 hours at 550° F | 5.63 | 28.3 | 6,640 |

It will be obvious from an examination of Table III that the dimer ester containing composition continues to gain in viscosity as the composition is heated. It is also apparent from Tables II and III that the normally heat stable polyester base oil is affected by the viscosity change of both the dimer ester and the methacrylate polymer.

The data in Table IV following shows the improved thermal stability of a blend of this invention consisting of 70 percent by weight of di-2-ethylhexyl azelate, 10 percent by weight of a mixture of 40 percent polybutyl methacrylate and 60 percent of di-2-ethylhexyl sebacate, and 20 percent by weight of the dibutyl ester of the dimer of linoleic acid.

Table IV

|  | Kin. Vis. at— | |
|---|---|---|
|  | 210° F. | 100° F. |
| Before heating | 7.21 | 30.6 |
| After 6 hr. at 550° F | 5.43 | 25.8 |
| After 15 hr. at 550° F | 5.40 | 25.4 |
| After 24 hr. at 550° F | 6.82 | 37.0 |

The following table shows the improved thermal stability of a similar blend as described for Table IV but including 0.5 percent by weight of phenothiazine as an anti-oxidant.

Table V

|  | Kin. Vis. at— | |
|---|---|---|
|  | 210° F. | 100° F. |
| Before heating | 7.31 | 31.0 |
| After 6 hr. at 550° F | 5.32 | 24.0 |
| After 15 hr. at 550°-F | 6.10 | 30.6 |
| After 24 hr. at 550° F | 7.72 | 43.1 |

The results in the above Tables IV and V amply demonstrate the characteristics of the composition of the invention. After 6 hours of heating at 550° F. there is an appreciable drop in viscosity owing to the faster rate of decrease in viscosity by the methacrylate polymer. After a 14 hour heating period at 550° F. the viscosity of the composition has reached about its lowest point in viscosity reduction. From 15 hours to 24 hours of continuous heating in an open vessel, there is a gradual rise in viscosity to the point where the composition has returned to about its original viscosity. The dibutyl dilinoleate has succeeded in offsetting the viscosity reduction caused by the thermal instability of the methacrylate.

Obviously, many modifications and variations of the invention, as hereinbefore set forth, may be made without departing from the spirit and scope thereof and, therefore, only such limitations should be imposed as are indicated in the appended claims.

I claim:

1. A thermally stable high temperature lubricating oil composition comprising a major amount of a diester of a primary alcohol having from 4 to 30 carbon atoms and an aliphatic dicarboxylic acid having from 4 to 12 carbon atoms, from 1 to 20 percent by weight of a methacrylate polymer having a molecular weight between 5,000 and 20,000 and from 1 to 40 percent by weight of a diester of an aliphatic alcohol having from 1 to 10 carbon atoms and a dimer of ethylenic monocarboxylic acids having from 12 to 22 carbon atoms.

2. A thermally stable high temperature lubricating oil composition comprising a major amount of a diester of a primary alcohol having from 6 to 18 carbon atoms and an aliphatic dicarboxylic acid having from 6 to 12 carbon atoms, from 2 to 10 percent of a methacrylate polymer having a molecular weight between 5,000 and and 20,000, and from 10 to 30 percent of a diester of an aliphatic alcohol having from 1 to 10 carbon atoms and a dimer of an ethylenic monocarboxylic acid having from 12 to 22 carbon atoms.

3. A thermally stable high temperature lubricating oil composition comprising a major amount of a diester of a primary alcohol having from 6 to 18 carbon atoms and an aliphatic dicarboxylic acid having from 6 to 12 carbon atoms, from 2 to 10 percent of a polymer of esters of aliphatic alcohols having from 4 to 18 carbon atoms and methacrylic acid, said polymer having a molecular weight between 5,000 and 20,000, and from 10 to 30 percent by weight of a dialkyl ester of the dimer of linoleic acid, said alkyl group having from 1 to 10 carbon atoms.

4. A thermally stable high temperature lubricating oil composition as described in claim 3 wherein the diester is dioctyl adipate and the dimer acid ester is dibutyl dilinoleate.

5. A thermally stable high temperature lubricating oil composition as described in claim 3 wherein the diester is dioctyl sebacate and the dimer acid ester is dibutyl dilinoleate.

6. A thermally stable high temperature lubricating oil composition as described in claim 3 wherein the diester is dioctyl azelate and the dimer acid ester is dibutyl dilinoleate.

7. A thermally stable high temperature lubricating oil composition comprising a major amount of di-2-ethylhexyl azelate, about 8 to 12 percent of a 40 percent concentrate of a poly $C_4$–$C_{18}$ alkyl methacrylate having a molecular weight between 5,000 and 20,000, in a di-2-ethylhexyl sebacate carrier, from about 15 to 25 percent of dibutyl dilinoleate, and about 0.5 percent phenothiazine.

References Cited in the file of this patent

UNITED STATES PATENTS

| 2,673,184 | Morway | Mar. 23, 1954 |
| 2,722,518 | Watson | Nov. 1, 1955 |

OTHER REFERENCES

"Symposium on Synthetic Lubricants," A.S.T.M. publication No. 77, 1947, p. 23.